US008056772B2

(12) United States Patent
Ophardt et al.

(10) Patent No.: US 8,056,772 B2
(45) Date of Patent: Nov. 15, 2011

(54) VACUUM RELEASE MECHANISM

(75) Inventors: Heiner Ophardt, Vineland (CA); Ali Mirbach, Issum (DE)

(73) Assignee: Gotohti.com Inc., Beamsville, Ontario (CA)

( * ) Notice: Subject to any disclaimer, the term of this patent is extended or adjusted under 35 U.S.C. 154(b) by 826 days.

(21) Appl. No.: 12/151,113

(22) Filed: May 5, 2008

(65) Prior Publication Data

US 2008/0304978 A1 Dec. 11, 2008

(30) Foreign Application Priority Data

Jun. 8, 2007 (CA) .................................... 2591046
Jan. 8, 2008 (CA) .................................... 2617202

(51) Int. Cl.
*G01F 11/00* (2006.01)

(52) U.S. Cl. ...... 222/321.7; 222/1; 222/152; 222/321.9; 222/340; 222/385; 222/481.5; 417/550

(58) Field of Classification Search ........... 222/1, 321.1, 222/321.3, 321.7, 321.8, 321.9, 340, 372–373, 222/375–376, 378, 384, 383.1, 385, 478, 222/481.5, 206, 209, 212–215, 181.1, 181.2, 222/152; 417/550, 559, 437
See application file for complete search history.

(56) References Cited

U.S. PATENT DOCUMENTS

| | | | | |
|---|---|---|---|---|
| 5,011,046 | A | 4/1991 | Graf et al. | |
| 5,282,552 | A * | 2/1994 | Ophardt | 222/181.2 |
| 5,373,970 | A * | 12/1994 | Ophardt | 222/181.2 |
| 5,676,277 | A * | 10/1997 | Ophardt | 222/83 |
| 5,979,711 | A * | 11/1999 | Fuchs et al. | 222/321.2 |
| 6,557,736 | B1 * | 5/2003 | Ophardt | 222/321.9 |
| 7,267,251 | B2 * | 9/2007 | Ophardt | 222/321.9 |
| 7,389,893 | B2 * | 6/2008 | Kasting | 222/321.4 |

FOREIGN PATENT DOCUMENTS

| | | |
|---|---|---|
| EP | 0 289 854 | 11/1988 |
| EP | 0 289 855 | 11/1988 |

* cited by examiner

*Primary Examiner* — Frederick C. Nicolas
(74) *Attorney, Agent, or Firm* — Riches, McKenzie & Herbert LLP

(57) ABSTRACT

A piston pump in which the piston carries a valve and a control mechanism to change a characteristic of the valve, preferably, its tendency to open. The valve may preferably comprise a disc which extends radially outwardly from the piston to resiliently engage the wall of piston chamber. The control mechanism preferably provides an access port communicating axially through the piston and axially out an opening of the piston chamber. In a preferred embodiment, the control mechanism comprises a bladder with a flexible side wall which can be moved from an inherent uncollapsed position to a different position and which bladder is inherently biased to return to its uncollapsed position.

20 Claims, 13 Drawing Sheets

Fig.2
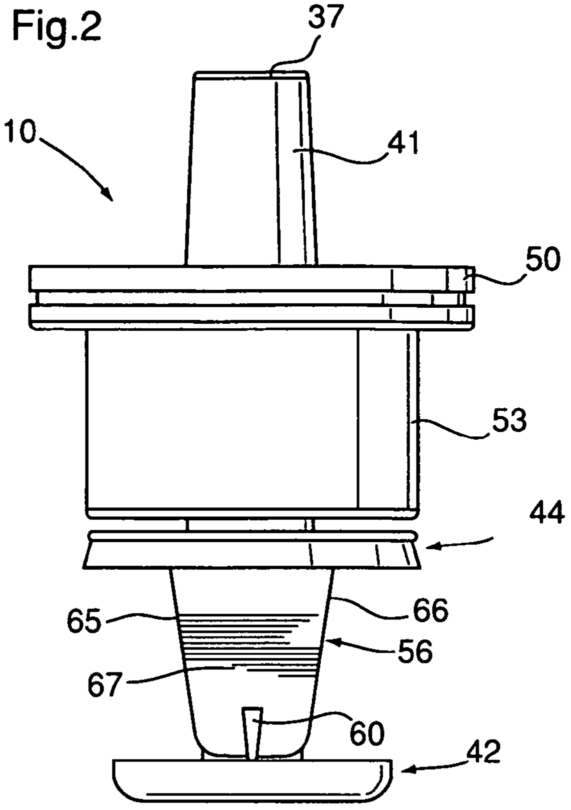
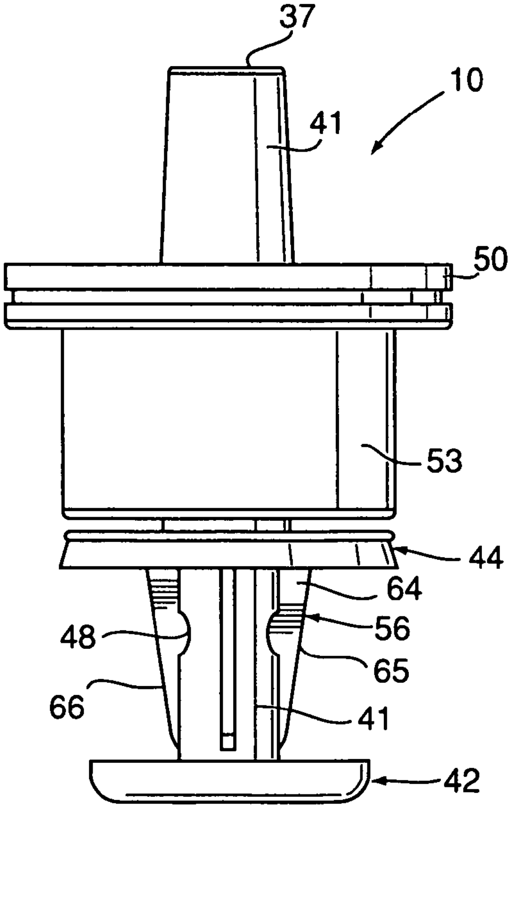
Fig.3

Fig.4
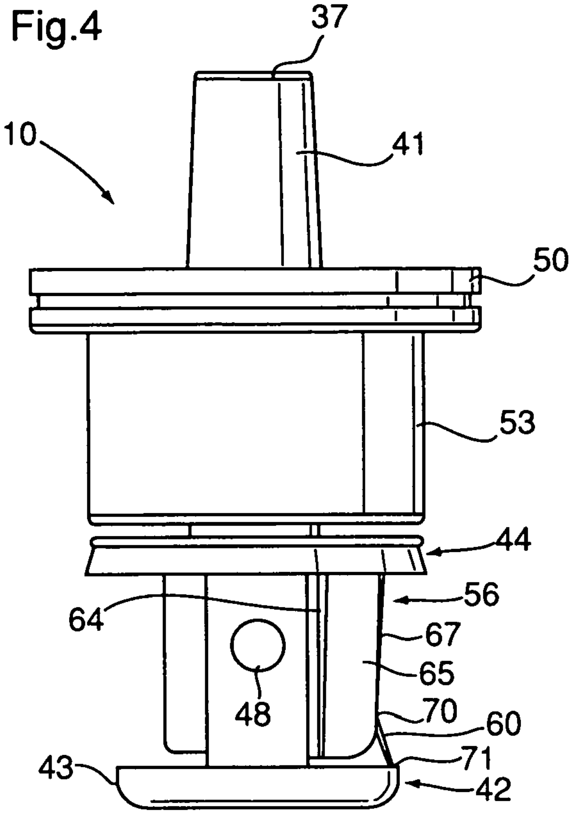
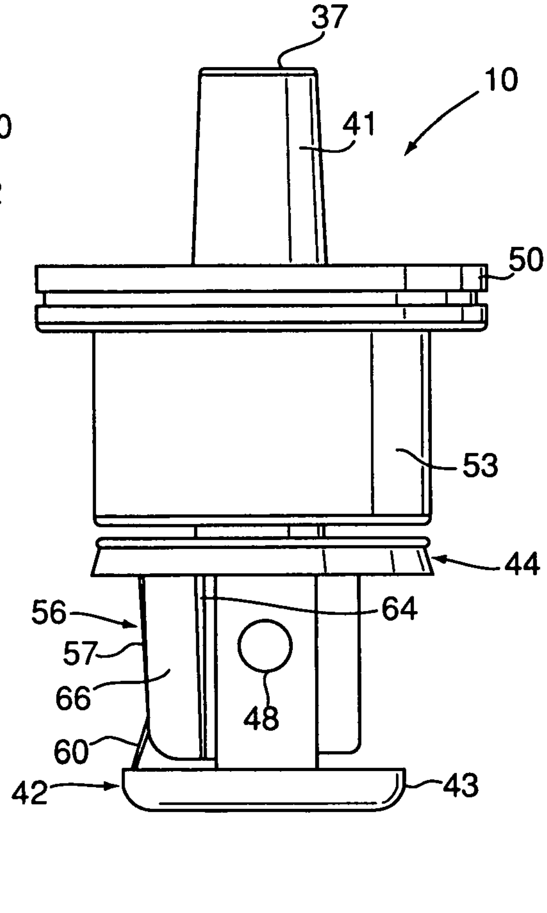
Fig.5

Fig.6
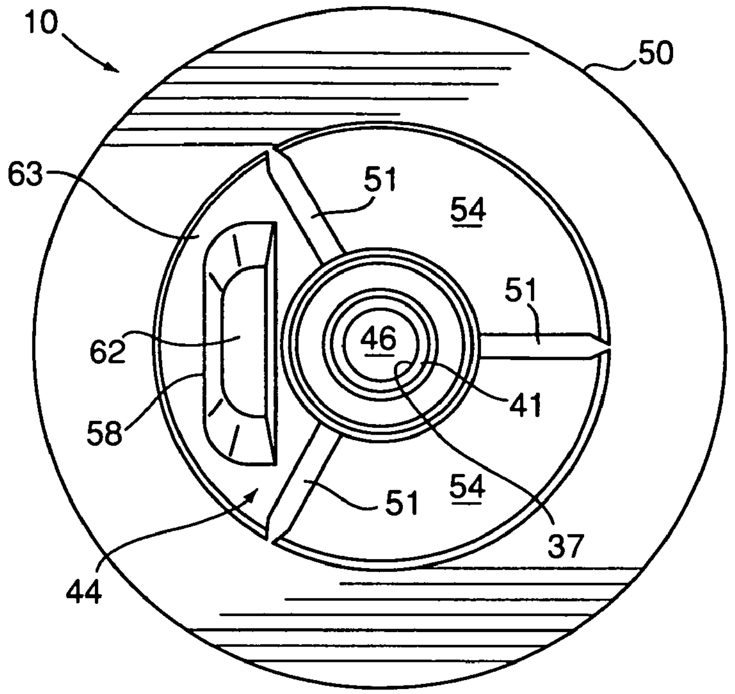
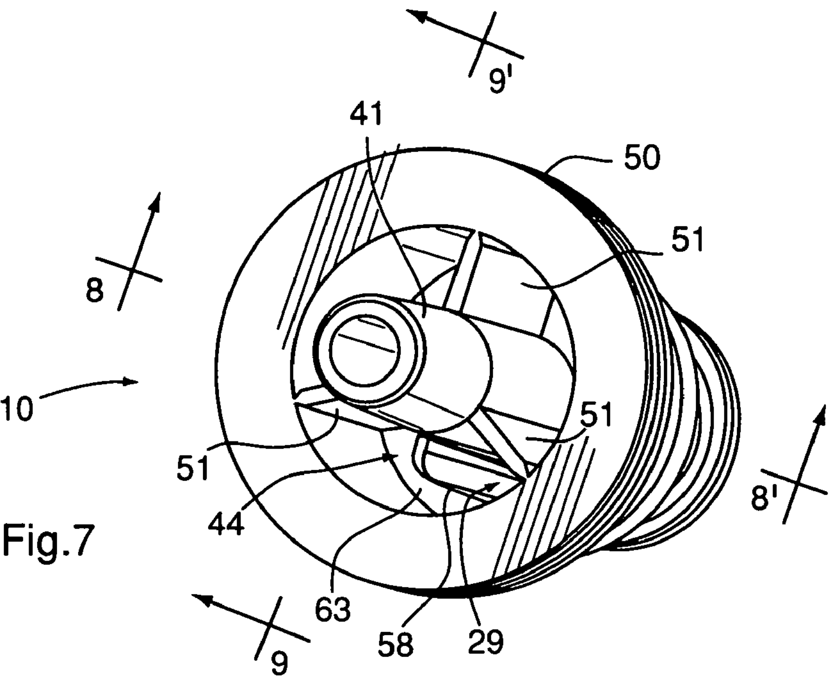
Fig.7

VACUUM RELEASE MECHANISM

SCOPE OF THE INVENTION

This invention relates to a valve assembly with a control mechanism for varying the characteristics of flow through the valve, and to a method for evacuating gas from a fluid containing reservoir.

BACKGROUND OF THE INVENTION

It is known to prepare a replaceable refill assembly incorporating a fluid reservoir by filling the reservoir with fluid to be dispensed, applying a valve assembly across the only outlet from the reservoir and then evacuating air or other gases from the reservoir by applying a vacuum across the valve assembly. Once all of the air is evacuated from the reservoir, the refill assembly incorporating the reservoir and its valve assembly is ready for coupling in a dispensing apparatus. The refill assembly has the advantage that it is ready to use in dispensing of the fluid without the need to evacuate further air or other gas from the reservoir. The valve mechanism attached to the outlet of the reservoir typically includes a one-way valve permitting air to be drawn outwardly from the reservoir, however, preventing air or other materials to flow into the reservoir. Advantageously, the one-way valve permits air or other gas to be drawn outwardly from the reservoir under a first vacuum pressure below atmospheric, however, an increased second vacuum pressure farther below atmospheric pressure, is required to draw the fluid outwardly pass the one-way valve. By selecting an evacuating vacuum which is between the first vacuum pressure but not as great as the second vacuum pressure, all of the air may be drawn out and once the air is drawn out, the fluid to be dispensed is not drawn out since the evacuating vacuum while adequate to draw out the air is not adequate to draw out the fluid.

The applicant has appreciated a difficulty which can arise when under certain circumstances, the vacuum which is required to draw air from the reservoir is approximately the same as or is less than the vacuum required to draw fluid from the reservoir. For example, under some circumstances, a one-way valve may be desired to have a sufficient inherent resiliency against opening that the vacuum necessary to be applied to draw air out is substantially equal to the vacuum required to draw fluid out. For example in some circumstances, a very strong bias against opening of the one-way valve may be desired when the fluid to be dispensed is a very low viscosity such as alcohol. In other circumstances, the resistance of the one-way valve to flow outwardly therepast may be desired to be very high as, for example, when the material may comprise viscous fluids or pastes such as soaps with granular particles such as pumice and a strong inherent bias of the valve member to move to a closed position is necessary to create a proper seal on normal closing of the valve member.

SUMMARY OF THE INVENTION

To at least partially overcome these disadvantages of previously known devices, the present invention provides a control mechanism to control the opening and/or closing characteristics of a valve member.

An object of the invention is to provide a one-way valve whose inherent tendency to assume an open or closed position can be selectively controlled.

Another object is to provide an improved piston for a pump incorporating a resilient one-way valve having a control mechanism to move the valve away from an inherent configuration to which it is biased to assume.

Another object is to provide an improved method of withdrawing air or gas from a reservoir.

The present invention provides a valve and a control mechanism to change a characteristic of the valve, preferably, its tendency to open. The valve may preferably comprise a disc which extends radially outwardly to resiliently engage the wall of a chamber. The control mechanism preferably provides an access port communicating axially out an opening of the chamber. In a preferred embodiment, the control mechanism comprises a bladder with a flexible side wall which can be moved from an inherent uncollapsed position to a different position and which bladder is inherently biased to return to its uncollapsed position. The bladder may be moved by applying a pressure to its interior, either a vacuum pressure below atmospheric to collapse the bladder or a pressure above atmospheric to expand the bladder. The bladder may also function as an access passageway for a push rod to deflect the disc as with the bladder suitably deformed from its inherent condition by a push rod which enters the bladder axially via the access port. A segment of the disc may be moved or deflected axially and/or radially to alter its sealing characteristics in the chamber. The valve may comprise a stopper for a bottle or a portion of a piston pump reciprocally slidable to dispense fluid from a reservoir.

In one aspect, the present invention provides a valve element comprising:

an axially extending stem, disc extending radially outwardly therefrom to a resilient outer edge portion, a collapsible bladder carried on the stem having an interior cavity enclosed but for being open to an access port, the bladder coupled to the outer edge portion of the disc, the bladder having an inherent resiliency biasing the bladder to assume an uncollapsed condition, the resiliency of the bladder providing for the bladder to assume a collapsed condition when a relative vacuum is applied to the interior cavity sufficient to over coming the inherent bias and with the inherent bias urging the bladder to assume the uncollapsed condition when such a relative vacuum is not applied to the interior cavity, in moving from the uncollapsed condition to the collapsed condition, the bladder moving a segment of the outer edge portion radially inwardly.

In another aspect, the present invention provides a method of preparing a replaceable fluid reservoir for insertion into a dispenser housing, wherein said reservoir has coupled thereto a pump assembly which when activated dispenses fluid from said reservoir, said pump assembly including, a chamber-forming element having a chamber, said chamber having chamber wall, an outer open end and an inner end in fluid communication with said reservoir, and one-way valve means disposed across said chamber permitting fluid flow therepast through the chamber only from the reservoir outwardly towards the outer open end, said one-way valve means permitting air to be drawn therepast towards the outer open end under a first negative pressure while permitting fluid to be drawn therepast under a second negative pressure which is further below atmospheric pressure than said first negative pressure, said method comprising the steps of:

substantially filling said reservoir with fluid, and evacuating air from said reservoir by applying a vacuum to a portion of said chamber which is spaced outwardly from said one-way valve means, said vacuum providing vacuum pressure at least as far below atmospheric pressure as said first negative pressure to draw out air from said chamber and said reservoir.

wherein said pump assembly includes a piston forming element configured to be slidably received in the chamber, and wherein axially inward and outward sliding of said piston forming element in said chamber dispenses said fluid, said piston element comprising:

an axially extending stem, a disc extending radially outwardly therefrom to a resilient outer edge portion, the piston element coaxially slidably received in the chamber with the outer edge portion of the disc engaging the chamber side wall to restrict fluid flow through the chamber past the disc having regard to the pressure differential across the disc, the method further including during the step of evacuating air, deforming the disc to alter the engagement of the outer portion of the disc with the chamber side wall and temporarily change the extent to which the disc restricts fluid flow through the chamber past the disc having regard to the pressure differential across the disc.

BRIEF DESCRIPTION OF THE DRAWINGS

Further aspects and advantages of the invention will become apparent from the following description taken together with the accompanying drawings in which:

FIGS. 2 to 6 are, respectively, front, back, right side, left side and top views of the piston of FIG. 1;

FIG. 7 is a perspective top view of the piston of FIG. 1;

DETAILED DESCRIPTION OF THE DRAWINGS

Figure 8:
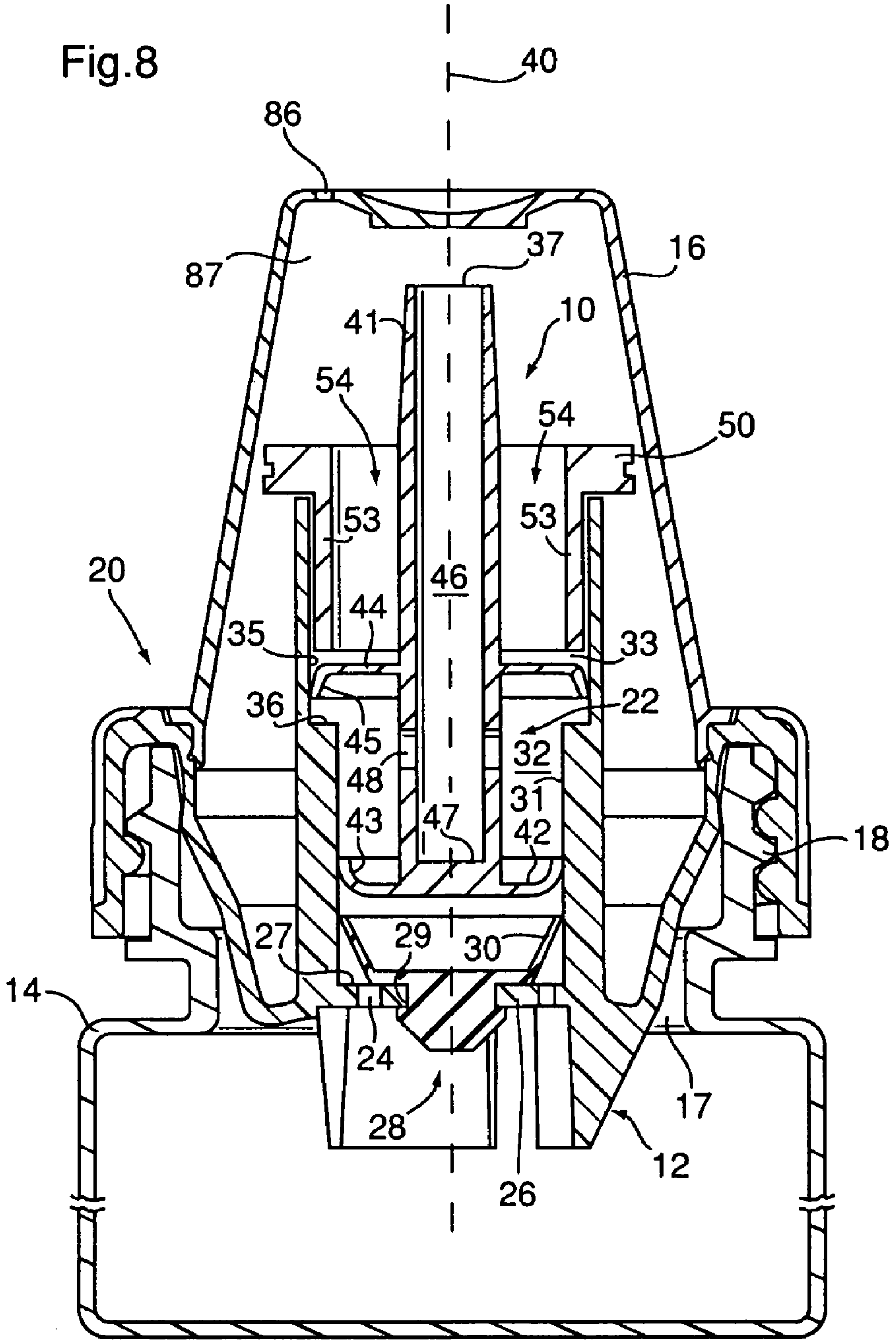
FIG. 8 is a cross-sectional side view showing the piston along section line 8-8' in FIG. 7 and also schematically showing in cross-section, a piston chamber forming member with a removable cap coupled to a reservoir bottle.

Reference is made first to FIG. 8 which shows a replaceable refill unit 20 comprising a reservoir bottle 14 to which a pump assembly is attached comprising a piston 10 slidably received within a piston chamber forming member 12. A removable cap 16 is snap-fitted onto the piston chamber forming member 12. The reservoir bottle 14 is only schematically shown. The bottle 14 is preferably a collapsible bottle closed but for having an outlet 17 carrying a threaded neck 18. The piston chamber forming member 12 is adapted to be threadably engaged onto the neck 18 of the bottle. The piston chamber forming member 12 defines an interior chamber 22. Inlet openings 24 provides communication between the interior of the bottle 14 and the chamber 22 through a rear shoulder 26 provided at the inner end 27 of the chamber 22. A one-way valve 28 is shown secured to the shoulder 26 and extends radially outwardly as an annular disc 29 with a resilient outer edge portion 30 which is biased into engagement with an inner side wall 31 within the chamber 22. The one-way valve 28 prevents fluid flow from the chamber 22 back into the bottle 14 yet permits fluid flow outwardly from the bottle 14 into the chamber 22 by resilient deflection of the outer edge portion 30.

The chamber 22 in the preferred embodiment is illustrated as having an inner chamber 32 and an outer chamber 33. The inner chamber 32 and outer chamber 33 are coaxial with an outer end of the inner chamber 32 opening into the inner end of the outer chamber. The inner chamber 22 is defined within a cylindrical inner side wall 31. The outer chamber 33 is defined within a cylindrical outer side wall 35 which ends at the inner end of the outer chamber 33 as a stepped shoulder 36. The chamber 22 is thus formed as a stepped chamber with the inner chamber 32 having a lesser diameter than the outer chamber 33.

As seen in FIG. 8, the piston 10 is coaxially received within the piston chamber forming member 12 for reciprocal coaxial sliding therein to draw fluid past the one-way valve 28 and dispense it outwardly via a discharge opening 37 on the piston 10.

The piston 10 is generally cylindrical and, in the preferred embodiments, is preferably formed as a unitary element entirely of a plastic as by injection moulding. The piston 10 has a hollow stem 41 extending along a central longitudinal axis 40 of the piston 10. A circular resilient flexing inner disc 42 is located at the inwardmost end of the piston 10 and extends radially therefrom. The inner flexing disc 42 is sized to circumferentially abut the cylindrical inner side wall 31. The inner disc 42 has a resilient outer edge portion 43 which is inherently biased to extend radially outwardly into engagement with the inner side wall 31. The inner disc 42 is configured so as to prevent fluid flow inwardly therepast within the inner chamber 32. The outer edge portion 43 of the inner disc 42 has an inherent resiliency such that it may be deflected from engagement with the inner side wall 31 so as to permit fluid flow outwardly therepast within the inner chamber 32. An outer disc 44 is provided on the stem 41 outwardly of the inner disc 42. The outer disc 44 has an outer edge portion 45 which engages the outer side wall 35 to at least prevent fluid flow outwardly therepast, however, preferably to also substantially prevent fluid flow inwardly therepast. The piston stem 41 has a central hollow passageway 46 extending along the axis of the piston 10 and is closed at a blind inner end 47 and open to the discharge opening 37 at an outer end. Inlets 48 extend through the wall of the stem 41 located between the inner disc 42 and the outer disc 44 to provide communication from the chamber 22 between the inner disc 42 and the outer disc 44 into the passageway 46.

An engagement disc 50 is provided on the stem 41 outwardly of the outer disc 44. The engagement disc 50 is secured to the stem 41 by three radially and axially extending support vanes 51 best seen in FIG. 7. The support vanes 51 also support a cylindrical annular guide 53 having a radially outwardly directed surface sized to be marginally smaller than the outer side wall 35 to assist in guiding the piston 10 in coaxial alignment within the chamber 22 in relative reciprocal coaxial movement of the piston. Three channelways 54 extend through the guide 53 and the engagement disc 50 about the stem 41.

The refill unit 20 is adapted to be placed inside a dispenser with the cap 16 removed, with the piston chamber forming member 12 fixed to the dispenser and with an activation mechanism to engage the engagement disc 50 and move the piston 10 inwardly and outwardly relative to the piston chamber forming member 12 in cycles of operation. On outward movement of the piston 10 to a retracted position, fluid in the bottle 14 is drawn outwardly through the inlet openings 24 past the one-way valve 28 into the annular space between the one-way valve 28 and the inner disc 42. On inward movement of the piston 10 in a retraction stroke, fluid between the outer disc 44 and the inner disc 42 is pressurized and travels via the inlets 48 into the passageway 46 and hence out the discharge opening 37 at the same time that fluid between the one-way valve 28 and the inner disc 42 is forced outwardly past the inner disc 42 into the space between the inner disc 42 and the outer disc 44. The stepped nature of the chamber 22 is not necessary but can provide some advantageous drawback from the passageway 46 in an extension stroke.

Figure 9:
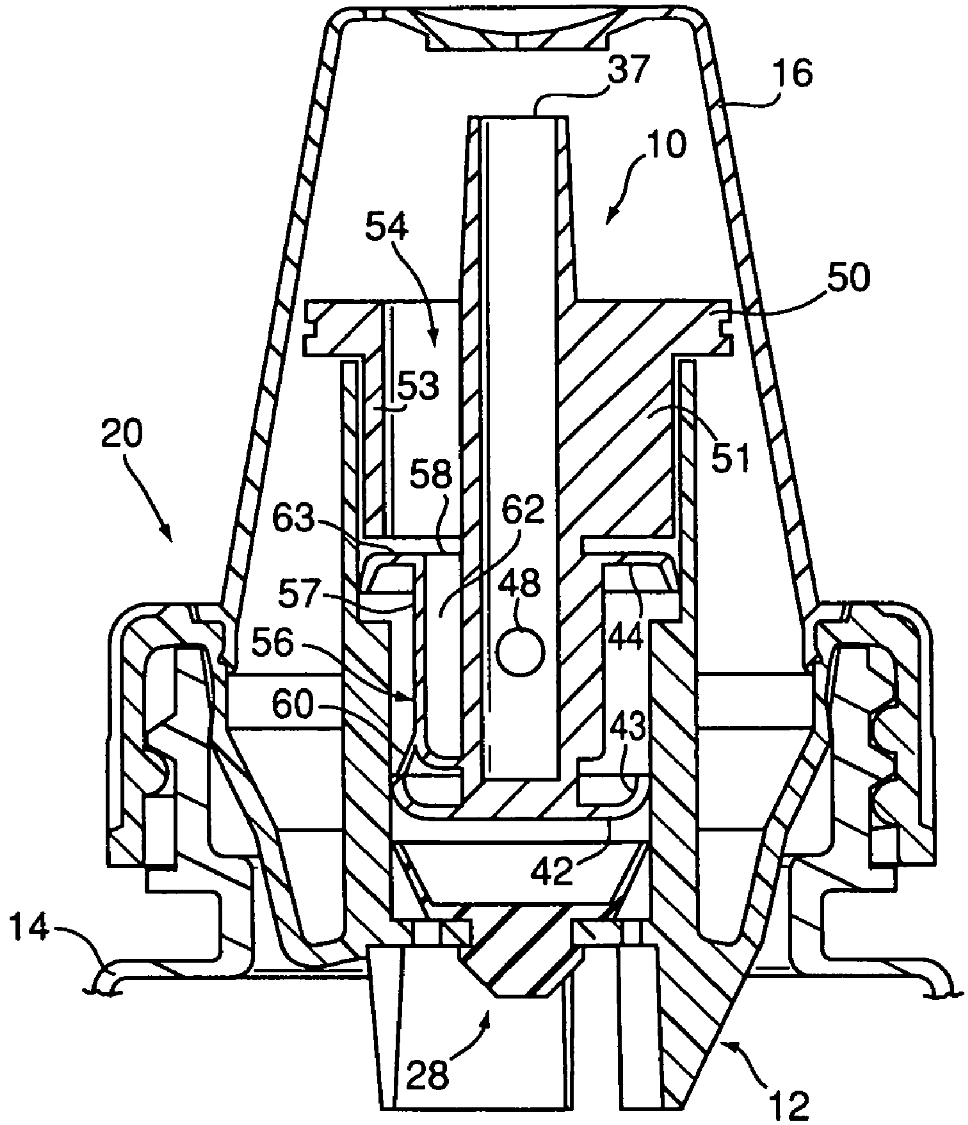
FIG. 9 is a side view similar to that shown in FIG. 8 but showing the piston along section line 9-9' in FIG. 7.

Reference is now made to FIG. 9 which shows a cross-sectional view the same as that as in FIG. 8, however, along a different cross-section through the piston 10 so as to show a control bladder 56 carried on the stem 41. The control bladder 56 includes a side wall 57 forming the control bladder as an enclosed vessel closed but open at an outwardly directed access port 58 directed outwardly through the outer disc 42 towards one of and centrally of one of the channelways 54. FIG. 9 also shows in cross-section a link arm 60 joining the side wall 57 of the control bladder 56 to the outer edge portion 43 of the inner disc 42.

Figure 10:
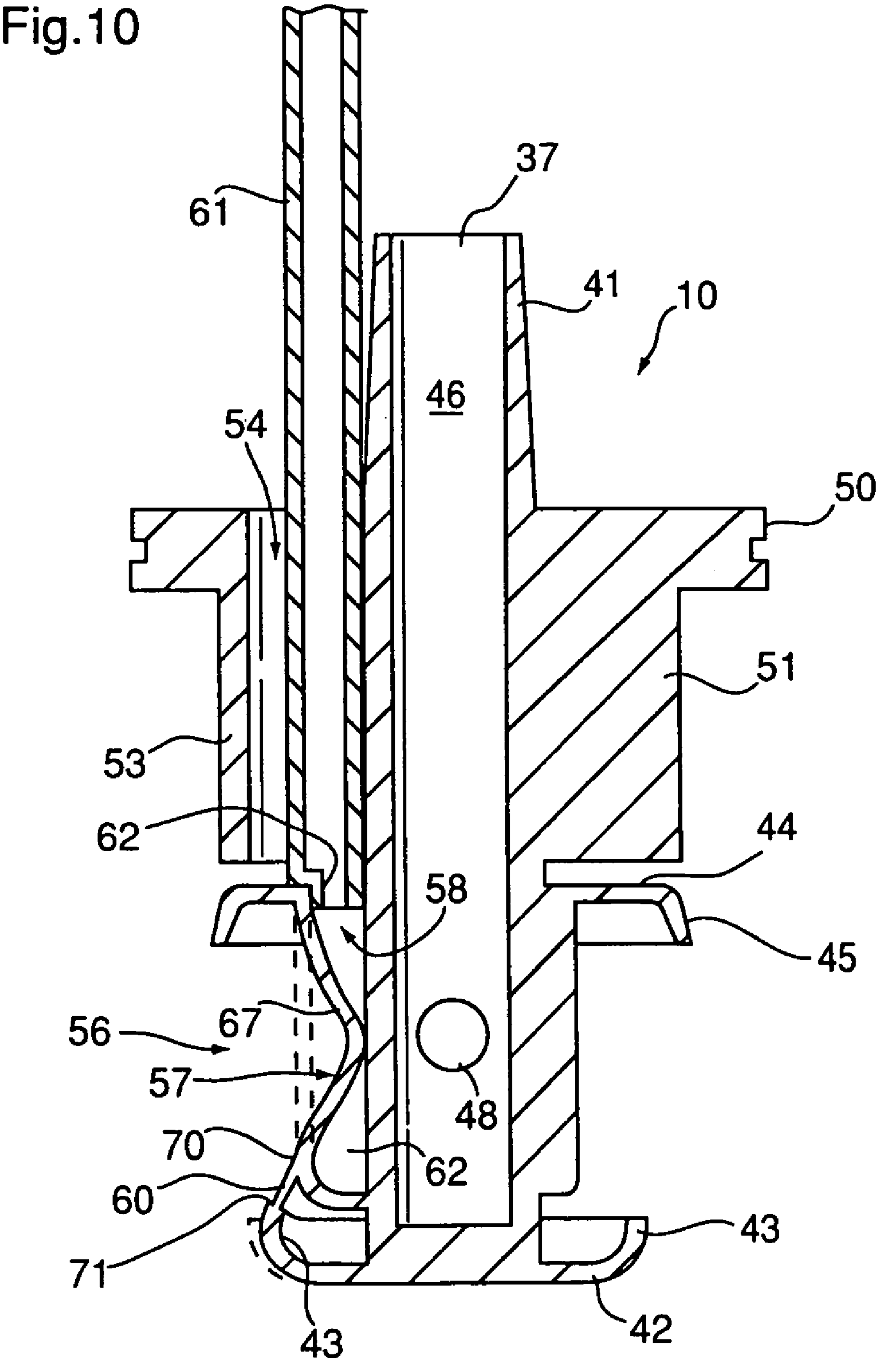
FIG. 10 is a cross-section merely of the piston as shown in FIG. 9 but with an evacuation tube positioned for applying vacuum to the control bladder.

Reference is made to FIG. 10 which illustrates a cross-sectional side view of the piston 10 as shown in FIG. 9 by itself but for the inclusion of bladder vacuum tube 61 having an inner end 62 sealably engaged within the access port 58 of the control bladder 56. FIG. 10 illustrates a condition in which a vacuum below atmospheric has been applied via the evacuation tube 61 to the interior cavity inside the control bladder 56 such that the control bladder 56 has been collapsed with its side wall 57 having been drawn inwardly from its normal position shown in dashed lines in FIG. 10. In drawing the side wall 57 of the control bladder 56 radially inwardly, the link arm 60 is placed in tension and draws the outer edge portion 43 of the inner disc 42 axially outwardly and radially inwardly from its normal position shown in dashed lines. Such radial inward movement of the edge portion 43 of the inner disc 42 facilitates the passage of fluid outwardly past the inner disc 42. The inner disc 42 may, when drawn inwardly as shown in FIG. 10, either be drawn into a condition in which portions of its circumference are out of engagement with the inner side wall 31 or a condition in which the outer edge portion 43 of the inner disc still engages the side wall 31, yet in which condition significantly lesser pressure differential across the inner disc 42 are required for fluid to be drawn outwardly therepast.

Figure 1:
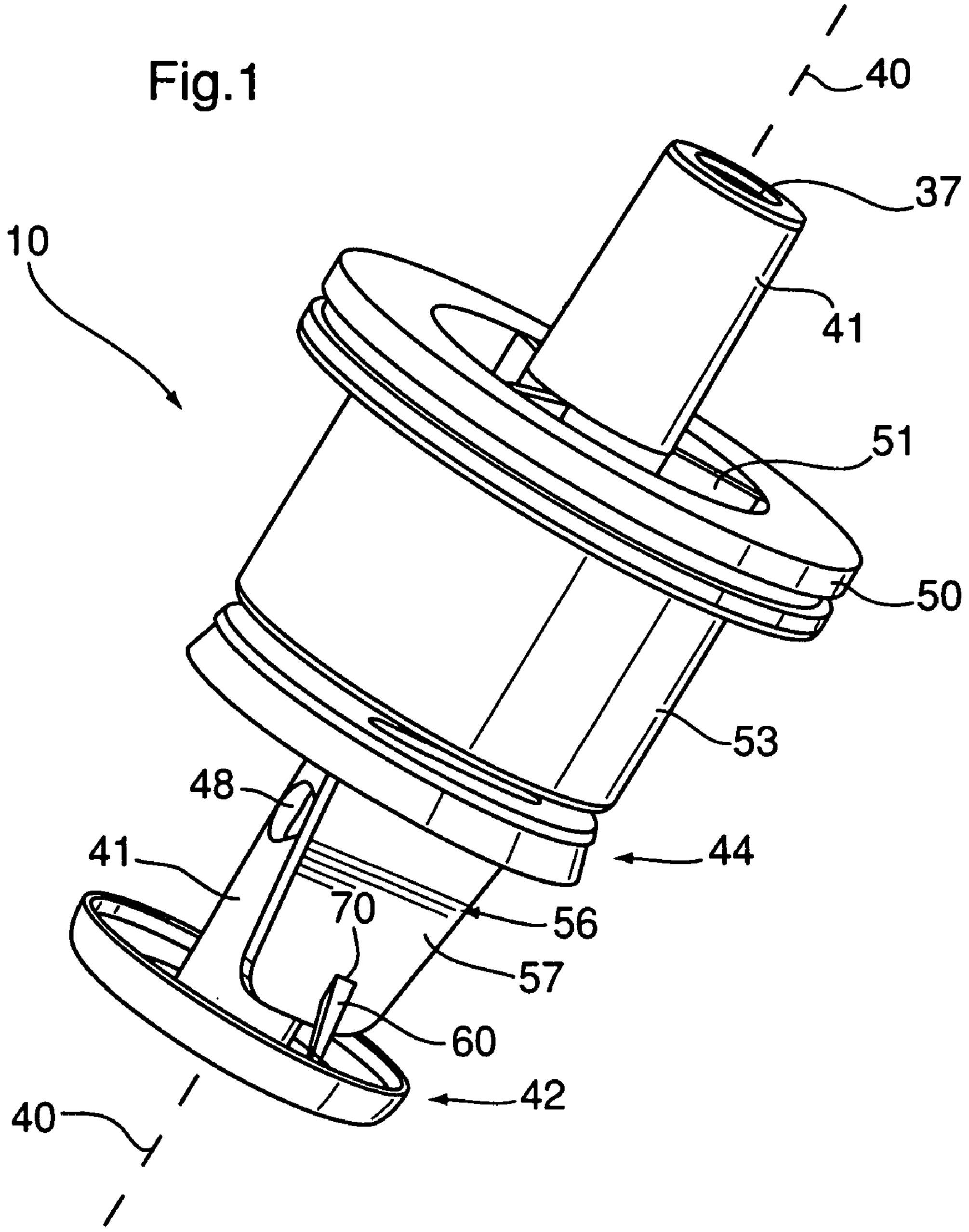
FIG. 1 is a perspective front view of an improved piston element in accordance with a first preferred embodiment of the present invention.

Reference is made to FIGS. 1 to 7 which further show the control bladder 56. FIG. 1 shows the control bladder 56 as carried on one side of the stem 41 with the link arm 60 extending between the side wall 57 of the control bladder 56 and a radially inwardly directed portion of the outer edge portion 43 of the inner disc 42. As seen in FIG. 2, the control bladder 56 tapers to decrease in width inwardly as is of assistance in forming the piston 10 by injection moulding with a removable insert to be received in the interior cavity 62 of the control bladder 56 and adapted to be removed axially outwardly after injection moulding. In this regard, the access port 58 may be seen in the top view of FIGS. 6 and 7 as opening outwardly through an outer surface 63 of the outer disc 44. The port 58 is of a smaller size than the channelway 54 between adjacent support vanes 51 as seen in FIG. 7. The side wall 57 of the control bladder 56 is shown to have a straight rear wall portion 64 from which two end wall portions 65 and 66 extend forwardly and curve to merge with a front wall portion 67. The back wall portion 64 is closely formed adjacent to the stem 41.

The port 58 extends through a central portion of the outer disc 44 and the side wall 57 of the bladder 56 is integrally coupled with this central portion about the port 58. This central portion is not required to deflect in operation. Thus, the connection of the bladder 56 to the disc 44 does not impair the operation of the outer disc 44 in providing sealing within the outer chamber 33.

The link arm 60 is an elongate member having an outer end 70 and an inner end 71. The outer end 70 is coupled to the side wall 57 of the control bladder 56 at a location centrally of the front wall portion 67. The inner end 71 is coupled to the outer edge portion 43 of the inner disc 42 at a radially inward portion of the outer edge portion 43. A longitudinal centrally through the link arm 60 from the outer end 70 to the inner 71 is disposed in a flat plane which extends radially and axially relative the central axis 40 of the piston 10. The link arm 60 extends radially relative the central axis and, as well, axially.

The side wall 57 of the control bladder 56 is selected to have suitable thickness over its front wall portion 67 and end wall portion 65 and 66 such that when a vacuum is applied to the interior cavity 62 of the control bladder, the front wall portion 67 will be deflected in a manner illustrated in FIG. 10 with the front wall portion 67 drawn inwardly and assuming a desired collapsed condition. By selective application of vacuum to the interior cavity 62 of the control bladder 56, the side wall 57 of the control bladder 56 may be moved from an inherent unbiased uncollapsed condition as, for example, shown in FIG. 9 to a collapsed condition as shown in FIG. 10. Suitable selection of the relative size and shape of the side wall 57 and its side wall portions and front wall portions provide for the control bladder 56 to adopt a collapsed condition which is advantageous to suitably displace the inner disc 42. Having regard to the nature of the collapsed condition of the control bladder, the link arm 60 may be suitably located and configured so as to have its outer end 70 of the link arm at a desired location on the side wall 57 and its inner end 71 of the link arm at a desired location on the inner disc 42.

Figure 11:
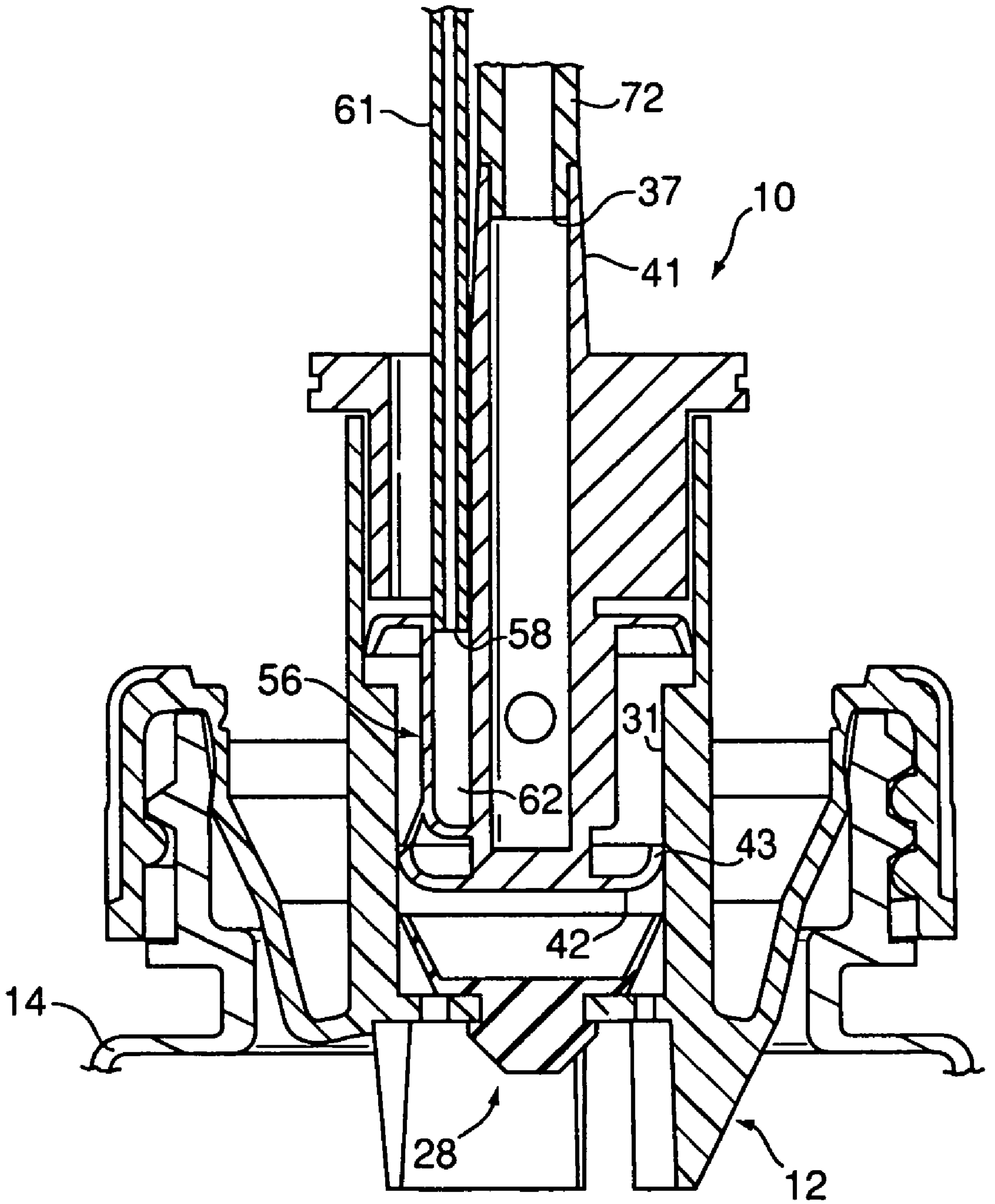
FIG. 11 is a cross-sectional side view similar to that shown in FIG. 9 with the cap removed and with evacuation tubes coupled to each of the control bladder and the piston discharge outlet.

In use in accordance with one aspect of the present invention, the bottle 14 is prepared by first substantially filling the bottle 14 with fluid to be dispensed. The pump assembly comprising the piston chamber forming member 12 and piston 10 are then applied to the bottle 14 by threadably coupling the pump assembly to the neck 18 of the bottle 14. With the bottle 14 preferably in a vertical position such as shown in FIG. 11, the vacuum tube 61 may be sealably coupled to the access port 58 of the control bladder 56 and, at the same time, an evacuation tube 72 may sealably engage the discharge opening 37 of the stem 41 and apply a vacuum thereto. The vacuum applied via the evacuation tube 72 will attempt to draw fluid outwardly past the inner disc 42 and the one-way valve 28. The control tube 61 will apply a vacuum which will preferably collapse the control bladder 56. Collapse of the control bladder 56 will reduce the resistance the inner disc 42 provides to fluid flow therepast.

Figure 12:
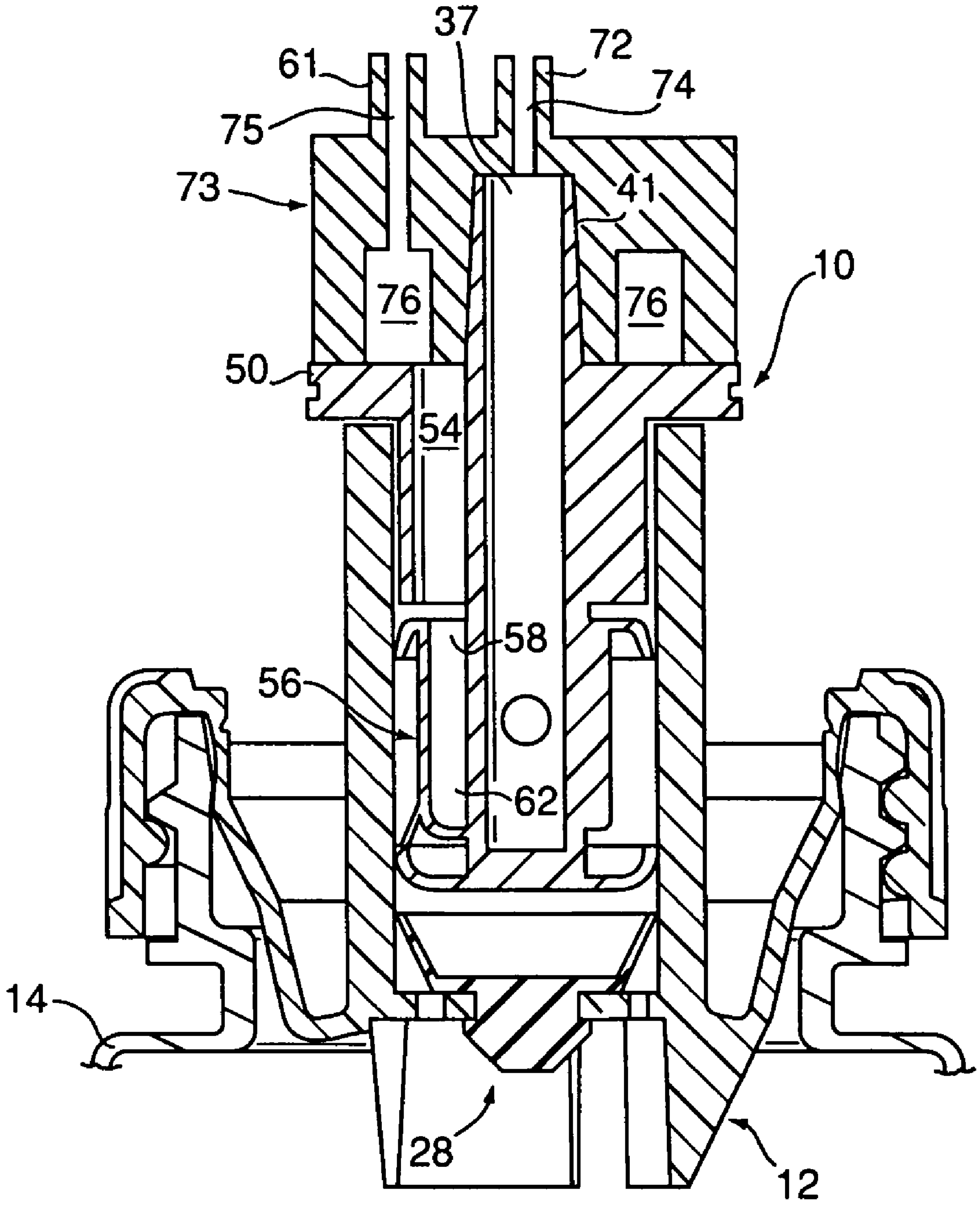
FIG. 12 is a cross-sectional side view similar to that in FIG. 11, however, showing an evacuation manifold for applying vacuum to each of the control bladder and the piston discharge outlet, and with the piston and piston chamber forming member as a modified second embodiment.

FIG. 11 illustrates a configuration in which a separate vacuum tube 61 and a separate evacuation tube 72 are utilized. FIG. 12 illustrates an arrangement in which a manifold 73 is provided for engagement with the outer end of the piston 10 and serving to also provide for suitable separate application of vacuums to the port 58 and the discharge opening 37 of the piston 10. In FIG. 12, an evacuation passageway 74 is in sealed communication with discharge opening 37 at the outer end of the stem 41. A vacuum passageway 75 communicates with an annular opening 76 open via the channelways 54 with the port 58 to the control bladder 56. In the arrangement of FIG. 12, the manifold 73 urges the piston 10 into the piston chamber forming member 14 such that annular seals are formed by the engagement of the manifold 73 with the engagement disc 50 and the engagement of the engagement disc 50 with the outer end of the piston chamber forming member 12.

Referring to FIG. 8, in one preferred use of the refill unit 20, with the cap 16 applied and with the cap 16 forming an annular seal with the piston chamber forming member 12, a vacuum is applied to the sole outlet opening 86 through the cap 16. A vacuum is thus created inside the interior 87 of the cap 16 which vacuum can serve to both collapse the control bladder 56 and draw fluid outwardly past the one-way valve 28 and the inner disc 42. Rather than apply the same vacuum pressure to each of the port 58 and the discharge opening 57, it is preferred to apply separate vacuums, for example, of different degrees of vacuum below atmospheric to the control bladder 56 and the discharge opening 57 as illustrated in FIGS. 11 and 12.

In the context, for example, of the embodiments illustrated in FIG. 11, a vacuum is preferably applied to the vacuum tube 61 sufficiently to draw the outer edge portion 43 of the inner disc 42 inwardly but not out of total engagement with the inner chamber side wall 31. In this condition, the inner disc 42 will permit air or other gas to be drawn outwardly therepast when a vacuum is applied thereacross at least equal to a first vacuum pressure below atmospheric pressure. In the same configuration of the inner disc 42, the inner disc 42 will permit fluid to be drawn past the disc, however, with a second vacuum pressure required to draw the liquid past the inner disc 42, that is, a substantially greater vacuum than the first vacuum pressure to draw out gas. The second vacuum pressure is a vacuum which is greater below atmospheric pressure than the first vacuum pressure. Preferably, the vacuum pressure which is applied via the evacuation tube 72 is selected to be a vacuum pressure which will draw out gas past the inner disc 42 but does not draw out the fluid. Therefore, in operation, vacuum is applied to the control bladder 56 to collapse the same and then vacuum is applied to the discharge outlet 37 sufficient to draw out gas but insufficient to draw out the liquid. Thus, the vacuum applied to the evacuation tube 72 is to be selected to be intermediate the first vacuum pressure and the second vacuum pressure. In operation, by such a suitable selection of the pressure applied to the evacuation tube 72, air will be drawn out of the bottle 14, however, evacuation of the bottle 14 will inherently stop when all the air has been evacuated and the fluid commences to engage the inner disc 42.

In another manner of operation, with the control bladder 56 in a collapsed position, the outer edge 43 of the inner disc is drawn substantially out of engagement with the inner side wall 31 in which case gas or fluid is relatively free to be drawn outwardly past the inner disc 42. The one-way valve 28 therefore will substantially determine the vacuum pressures desired to be applied to the evacuation tube 72 to withdraw air past the one-way valve 28 but to not draw fluid therepast. In many embodiments, it is the combined ability of the one-way valve 28 and the inner disc 42 to permit air to pass therethrough under a certain first vacuum pressure condition but to not permit fluid to pass therepast unless a greater second vacuum pressure condition exists needs to be considered to provide for proper evacuation.

The particular construction of the piston element 10 shown permits the piston element 10 to advantageously be manufactured as by injection moulding as a unitary element, although this is not necessary. It is to be appreciated that most pumps involve at least two one-way valves. A piston for a pump may advantageously carry at least one of these one-way valves on the piston to have a control bladder as described so as to assist in the control of the functional characteristics of the valve carried by the piston.

The preferred embodiments illustrate but a single control bladder 56 provided to assist in controlling the inner disc 42. It is to be appreciated that a mirror image second control bladder (not shown) could be provided on the opposite side of the stem 41 thus providing a second link arm to draw the inner disc 42 back at a second location. It is believed that for most instances there is no need for a second or third or more control bladders for the same disc.

In the first embodiment illustrated in FIGS. 1 to 11, the chamber 22 is shown as being a stepped chamber as can be advantageous to provide drawback of fluid from the discharge opening 57 to prevent dripping. The chamber 22 need not be a stepped chamber. FIG. 12 illustrates a virtually identical pump to that shown in FIG. 11, however, with the chamber 22 not stepped and the inner disc 42 and outer disc 44 are of the same diameter.

Figure 13:
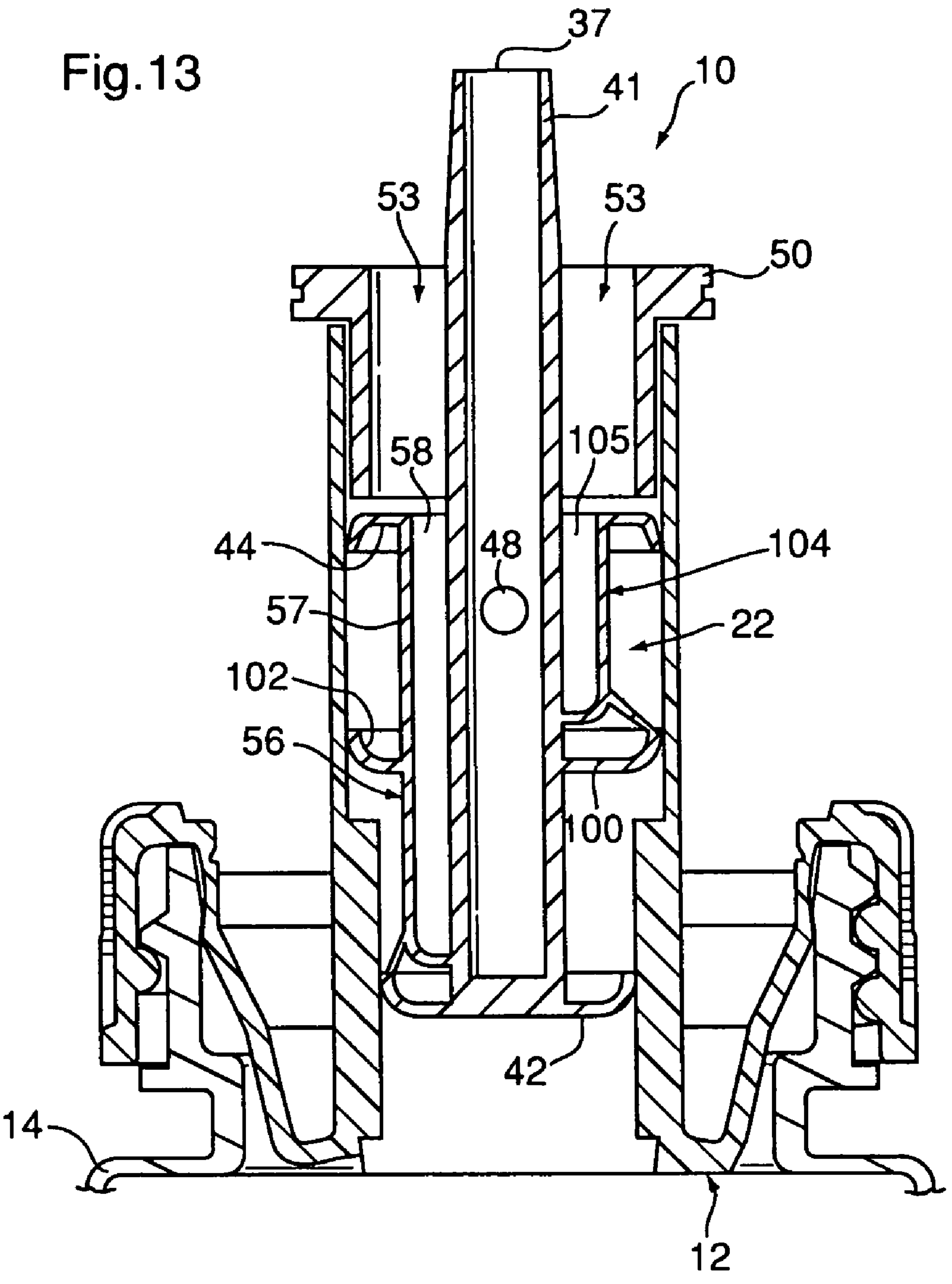
FIG. 13 is a cross-sectional side view similar to that shown in FIG. 11 but of a third embodiment in accordance with the present invention.

FIG. 13 illustrates an embodiment of a pump arrangement having similarities to the pump of FIG. 9 but which relies on a stepped chamber 22 for providing pumping action. The piston 10 carries in addition to the inner disc 42 and the outer disc 44 and intermediate disc 100. The one-way inlet valve 28 of the embodiment of FIG. 9 is eliminated from the embodiment of FIG. 13. The inlets 48 are located between the intermediate disc 100 and the outer disc 44. The intermediate disc 100 has a resilient outer edge portion 102 which deflects inwardly to permit fluid flow outwardly therepast.

The intermediate disc 100 has an intermediate control bladder 104 associated therewith whose access port 105 opens outwardly. The inner disc 42 has its control bladder 56, however, extended such that its side wall 57 extends through the intermediate disc 100 to present its access port 58 on the outer side of the outer disc 44. By suitable application of vacuum pressure to the intermediate disc control bladder 105, the outer edge portion 102 of the intermediate disc 100 may be drawn radially inwardly to lower the pressure differential required for flow outwardly past the intermediate disc 100. Similarly, by suitable application of vacuum pressure to the inner disc control bladder 56, the outer edge portion 43 of the inner disc 42 may be drawn radially inwardly to lower the pressure differential required for fluid flow outwardly past the inner disc 42.

Figure 14:
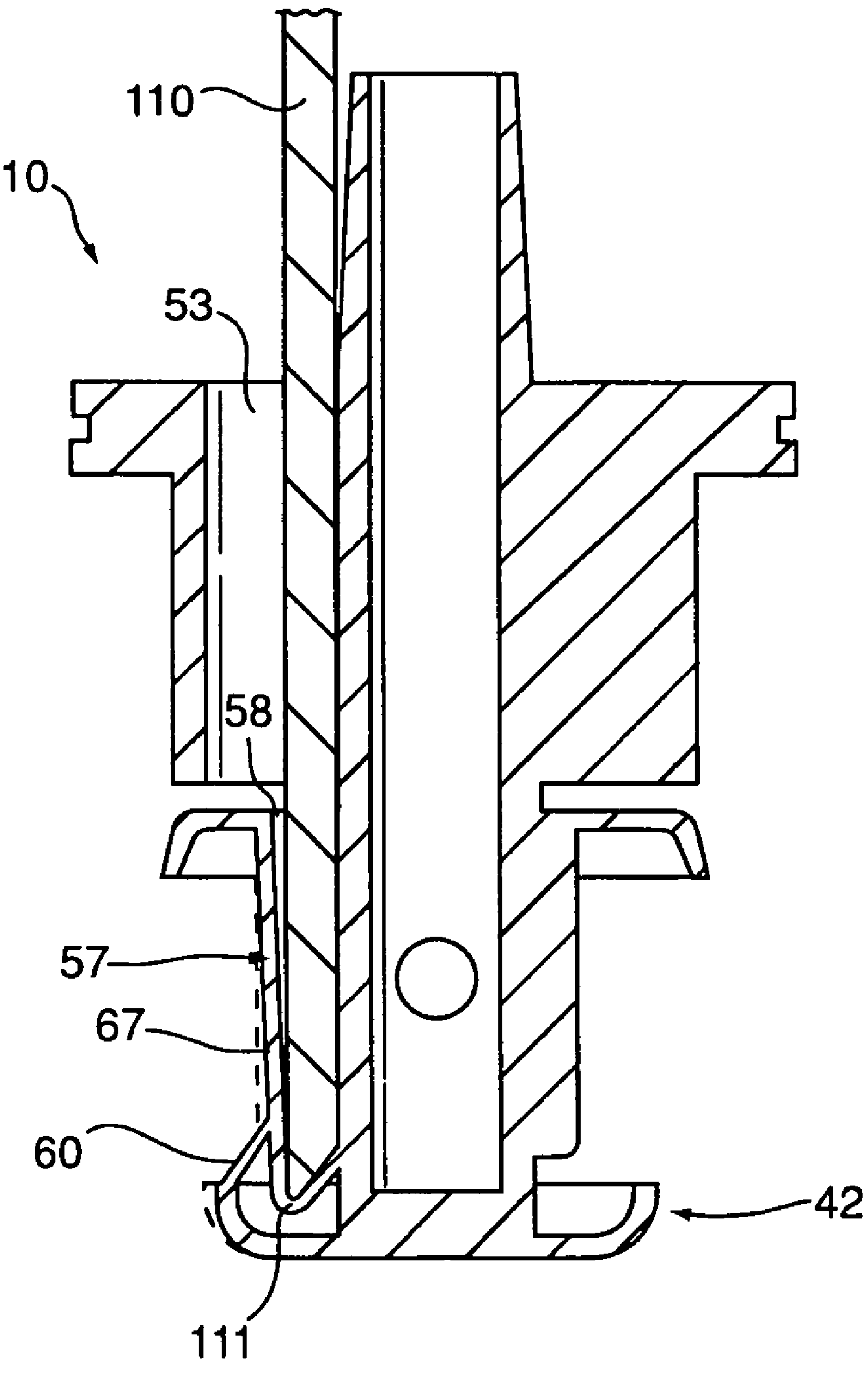
FIG. 14 is a cross-sectional side view of a piston as shown in FIG. 9 but in use with a mechanical push rod.

Reference is made to FIG. 14 which illustrates a cross-sectional side view similar to that in FIG. 10 and showing an alternative embodiment in which rather than apply a vacuum pressure to the interior cavity of the bladder 56, a rigid mechanical push rod 110 is inserted through the access port 58 and forcibly urged relative to the piston 10 axially inwardly so as to displace the blind end portion 111 of the side wall 57 of the bladder 56 axially inwardly thus moving the front wall portion 67 of the side wall radially inwardly. As shown, the tool 110 has a radially inwardly directed surface which is bevelled to extend radially inwardly and axially outwardly towards assisting in deflecting of the blind wall portion 111 axially inwardly and requiring the front wall portion 67 to move radially inwardly. As with the other embodiment, radial inward movement of the front wall portion 67 draws the link arm 60 and the outer edge portion 43 of the inner disc 42 at least partially radially inwardly.

Figure 15:
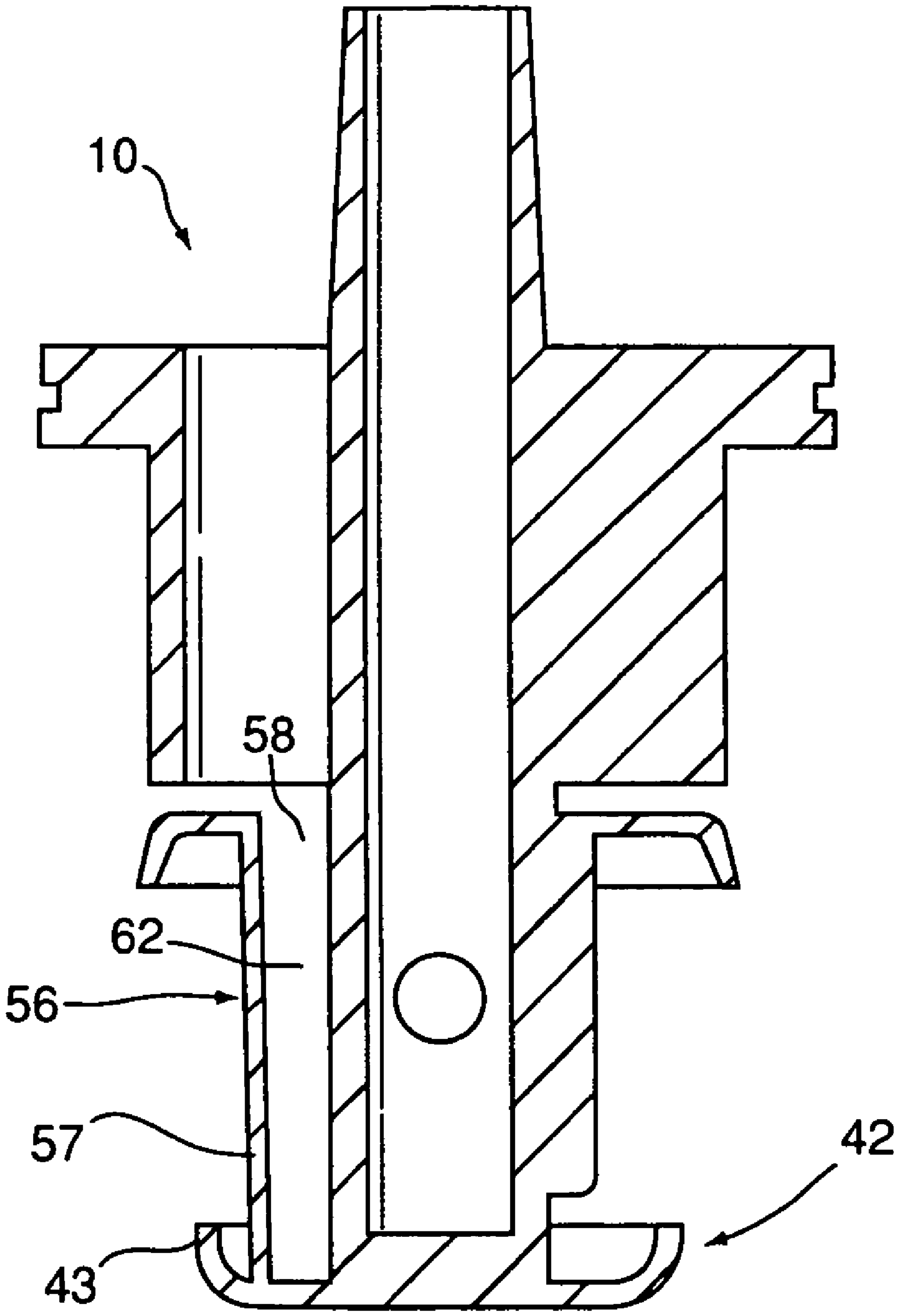
FIG. 15 is a cross-sectional side view similar to that shown in FIG. 14 but of a fourth embodiment which avoids the use of a link arm.

FIG. 15 illustrates a further embodiment shown in cross-section similar to that in FIG. 10, however, in which the face wall portion and the side wall portions of the bladder 56 extend rearwardly to join with a central portion of the inner disc 42 such that an inwardmost blind end wall portion of the bladder is formed by a portion of the inner disc 42. In FIG. 15, no link arm is shown although one could be provided if desired. By applying a vacuum pressure to the interior cavity 62 of the bladder shown in FIG. 15 or by insertion of a mechanical tool similar to that shown in FIG. 14 upwardly through the bladder cavity, at least some annular portion of the inner disc 42 may be moved axially inwardly thus, to at least some extent, marginally drawing an adjacent portion of the outer edge portion 43 of the inner disc 42 radially inwardly.

In the preferred embodiments of FIGS. 1 to 13, variation of the characteristics of a disc on the piston is modified by the application of vacuum to a collapsible bladder. In the embodiment of FIG. 14, a tool accessible via the axially extending access port 58 changes the characteristic of a disc carried by the piston.

Rather than apply vacuum to the interior cavity 62 of the bladder 57, it is possible to apply a relatively increased pressure with the bladder, for example, to assume an expanded condition which could modify the characteristics of a valve disc carried on the piston. For example, a bladder could be provided underneath the outer disc 44 open axially outwardly about the stem 41 and which when expanded might, for example, increase the resistance of the central portion of the outer disc 44 from deflecting axially outwardly. The bladders 56 illustrated in FIGS. 1 to 13 only extend partially about the stem 41. It is to be appreciated that the bladders 56 could extend annularly about the stem 41, for example, as an annular bladder underneath the outer disc 42 opening axially outwardly.

While the bladder, whether collapsible or expandable, may be coupled to a portion of a disc by a link member such as link arm 60 shown in FIG. 1, it is also to be appreciated that the bladder may incorporate as part of an exterior wall of the bladder a portion of a disc carried on the piston such as shown in FIG. 15. Referring to FIG. 15, FIG. 15 is a cross-sectional view identical to that shown in FIG. 14 but modified such that: the control bladder 56 has its side wall 57 extended inwardly to end at the outer disc 42 and the link arm 60 is eliminated. With collapse of the control bladder 56, the front wall portion 67 of side wall 57 will, in a similar manner to that shown in FIG. 10, be drawn radially inwardly thus deflecting a portion of the outer disc 42 marginally axially outwardly and/or radially inwardly.

Figure 16:
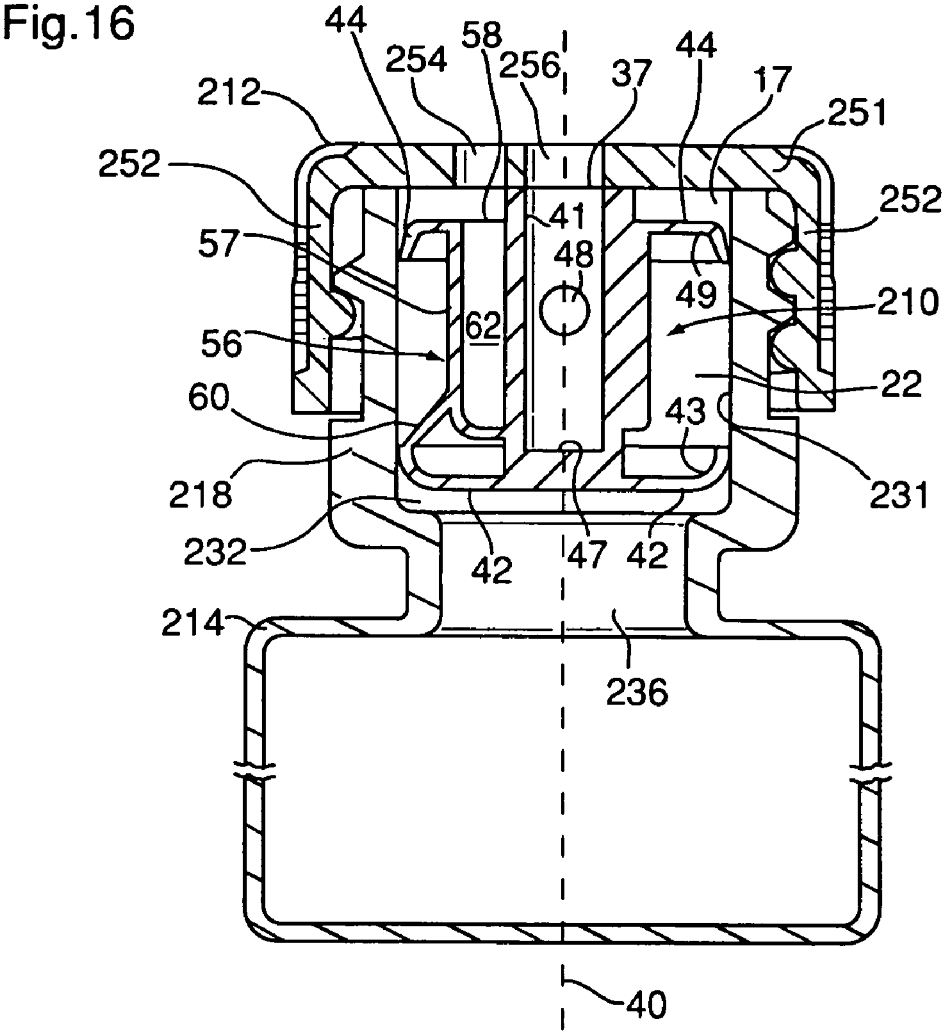
FIG. 16 is a cross-sectional side view of a valve element in accordance with a fifth embodiment of the present invention as received in the end of a enclosed reservoir bottle 14 only schematically shown.
Figure 17:
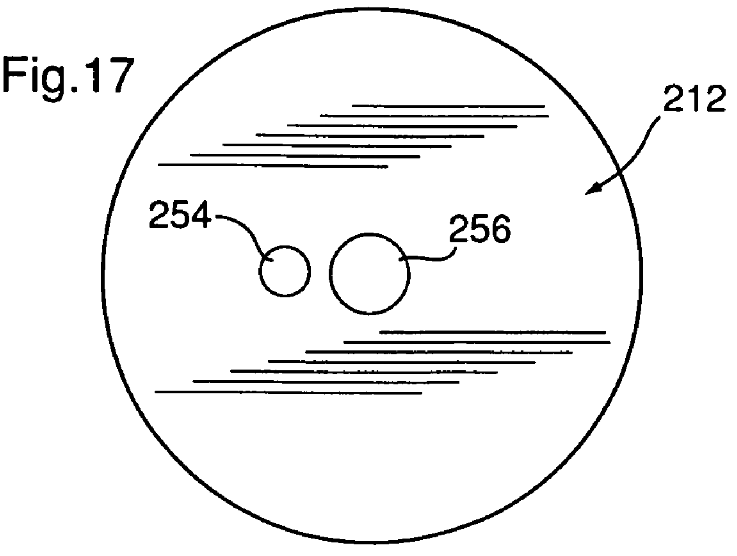
FIG. 17 is a top view of the cap for the bottle shown in FIG. 16.

Reference is made to FIGS. 16 and 17 which schematically show a piston or valve element 210 coaxially slidably received within a reservoir bottle 14. The reservoir bottle is shown as enclosed but for having an outlet 17 carrying a threaded neck 218, a cap member 212 is adapted to be threadably engaged onto the neck 218 of the bottle. The bottle 14 has an inner chamber 232 defined coaxially within the threaded neck 218 and open to the outlet 17 at the outer end of the threaded neck 218. The chamber 232 is in communication with the interior of the bottle 14. The inner chamber 232 is defined within a cylindrical side wall 231. The inner chamber 232 is open at an outer end to the outlet 17 and at an inner end to an inlet 236 in communication with the interior of the bottle 214.

The valve member 210 is coaxially received within the chamber 232. The valve element 210 is a generally cylindrical configuration and is preferably formed as a unitary element entirely of plastic as by injection molding. The valve element 210 has a hollow stem 41 extending along a central longitudinal axis 40 of the valve element 210. A circular resilient flexing disc 42 is located at the innermost end of the valve element 210 and extends radially therefrom. The inner flexing disc 42 is sized to circumferentially abut the cylindrical side wall 231. The inner disc 242 has a resilient outer edge portion 43 which is inherently biased to extend radially outwardly into engagement with the side wall 231. The inner disc 42 is configured so as to prevent fluid flow inwardly therepast within the chamber 232, that is, from the outlet 17 into the bottle 214.

The outer edge portion 43 of the inner disc 42 has an inherent resiliency such that it may be deflected from engagement with the side wall 231 so as to permit fluid flow outwardly therepast within the chamber 232.

An outer disc 44 is provided on the stem 41 outwardly from the inner disc 42. The outer disc 44 has an outer edge portion which engages the side wall 231 to at least prevent fluid flow outwardly therepast, however, preferably to also substantially prevent fluid flow inwardly therepast. The stem 41 has a hollow central passageway 46 extending along the axis 40 enclosed at a blind inner end 47 and open to a discharge opening 37 at an outer end. Inlets 48 extend through the wall of the stem 41 located between the inner disc 42 and the outer disc 44 to provide communication from a chamber 22 defined between the inner disc 42 and the outer disc into the passageway 46.

The closure cap member 212 is provided with an end wall 251 from which an annular flange 252 extends axially. The annular flange has internal threads adapted to mate with the external threads on the threaded neck 218 of the bottle 214. The cap member 212 is adapted to be threaded down onto the threaded neck 218 to form a seal between the outer end of the threaded neck and the inside surface of the end wall 251 of the cap member. A discharge orifice 256 is provided coaxially centered within the cap member providing communication through the cap member from the discharge opening 37 at the outer end of the piston 41. A portion 252 of the end wall of the cap member is provided annularly about the discharge aperture to sealably engage the outer end of the stem 41 about the discharge opening 37 so as preferably to form a seal therewith. A bladder access aperture 254 is also provided through the end wall 251 of the cap member for communication with the interior of a control bladder 56 carried on the stem 41. The control bladder 56 has a side wall 57 forming a control bladder as an enclosed vessel closed but open at an outwardly directed access port 58 directed outwardly through the outer disc 42 and in communication with the aperture 254. A link arm 60 joins the side wall of the control bladder 56 to the outer edge portion 43 of the inner disc 42. The bladder access aperture 254 is open to an annular space about the stem 41 between outer disc 42 and the end wall of the cap member 212 and, thus, in any rotational position of the cap member, the aperture 254 is in communication with the interior of the bladder 56, however, in a preferred orientation as shown in FIGS. 16 and 17, the aperture 254 provides axial access parallel to the axis 40 inwardly into the interior of the control bladder 56.

As will be appreciated, by the use of similar reference numerals for similar elements, the valve element 210 in FIG. 16 has a configuration substantially identical to portions of the piston 10 shown in FIGS. 1 to 10, at least in respect of those portions of the piston which are inward from the guide 53. Operation of the valve element 210 in respect of the removal of air from the bottle 14 is substantially the same as that described with the embodiment of FIGS. 1 to 10. In this regard, the bottle 14 is prepared by first substantially filling the bottle with flowable material to be dispensed. The valve element is placed in the chamber 232 within the neck of the bottle and then the cap is threadably coupled to the neck. With the bottle 14 preferably in a vertical position such as shown in FIG. 16, a vacuum tube may then be sealably coupled to the access port 54 of the control bladder 56 at the same that an evacuation tube 72 may sealably engage the discharge opening 37 of the stem 41 and apply a vacuum therethrough. An evacuation tube may, for example, extend downwardly through the central aperture 256 for sealable engagement with the passageway 46 within the stem 41. A control tube may extend downwardly through the aperture 254 for sealable engagement within the access port 58 of the control bladder 56 or may merely sealably engage with the aperture 254 to provide a vacuum to the interior of the control bladder 56. Vacuum applied to an evacuation tube will attempt to draw fluid outwardly past the inner disc 42. Vacuum applied to the control bladder 56 will preferably collapse the control bladder 56. Collapse of the control bladder 56 will reduce the resistance of the inner disc 42 provides to fluid flow therepast. The embodiment illustrated in FIGS. 16 and 17 provides a convenient piston-like valve element 210 which is adapted to be slid coaxially into the chamber 232 within the neck of the bottle 214. The valve element 212 in combination with the cap member 212 in the chamber 232 inside the bottle 214 provides a convenient arrangement for evacuating air from containers and could, for example, reduce the need for preservatives in bottles 214 or other similar containers which may contain, for example, soap or food since substantially all of the air in the bottle is removed.

In use of the bottle after it has been filled with fluid and the air dispensed, fluid could be dispensed from the bottle 214 by merely squeezing the bottle insofar as it is a compressible bottle. When squeezed, pressure within the bottle will discharge fluid past the inner disc and out the discharge outlet and hence through the central aperture 256 in the cap member. Alternatively, the cap member may be removed permitting removal of the valve element 210.

In the embodiment shown in FIG. 16, the valve element may be formed to be coupled to the cap member such that the cap member and valve element together form an element which can be removed and reapplied for dispensing fluid from the bottle. In replacing the cap member with the valve element coupled thereto onto the cap member, the valve element effectively is slidable axially into the open end of the bottle as in the manner of a coaxially slidable piston.

While the invention has been defined with reference to preferred embodiments, many modifications and variations will now occur to a person skilled in the art. For a definition of the invention, reference is made to following claims.

The invention claimed is:

1. A valve element comprising:

an axially extending stem, a disc extending radially outwardly therefrom to a resilient outer edge portion, a collapsible bladder carried on the stem having an interior cavity enclosed but for being open to an access port, the bladder coupled to the outer edge portion of the disc, the bladder having an inherent resiliency biasing the bladder to assume an uncollapsed condition, the resiliency of the bladder providing for the bladder to assume a collapsed condition when a relative vacuum is applied to the interior cavity sufficient to over coming the inherent bias and with the inherent bias urging the bladder to assume the uncollapsed condition when the relative vacuum is not applied to the interior cavity, in moving from the uncollapsed condition to the collapsed condition, the bladder deflecting a segment of the outer edge portion.

2. A valve element as claimed in claim 1 wherein deflecting the segment comprises moving the segment axially and/or radially.

3. A valve element as claimed in claim 2 wherein deflecting the segment comprises moving the segment radially inwardly.

4. A valve element as claimed in claim 1 the bladder is coupled to the outer edge portion of the disc by a link arm having a first end coupled to the outer edge portion of the disc and a second end coupled to the bladder.

5. A valve element as claimed in claim 3 the bladder is coupled to the outer edge portion of the disc by a link arm having a first end coupled to the outer edge portion of the disc and a second end coupled to the bladder.

6. A valve element as claimed in claim 1 integrally formed as a unit from plastic material by injection moulding.

7. A valve element as claimed in claim 1 wherein the interior cavity of the bladder extends from a blind end proximate to the disc axially away from the disc to the access port.

8. A valve element as claimed in claim 7 wherein the bladder includes a side wall defining the interior cavity therein, a back wall portion of the side wall of the bladder having an exterior directed towards the stem;

a front wall portion of the side wall opposite the back wall portion directed radially outwardly away from the back wall, the front wall portion joined to the back wall portion by end wall portions of the side wall, the front wall portion being resilient such that when a sufficient pressure differential exists across the front wall portion, the front wall portion deflects to move towards the back wall portion.

9. A valve element as claimed in claim 7 wherein the front wall portion of the bladder is coupled to the outer edge portion of the disc.

10. A valve element as claimed in claim 9 further including a link arm having a first end coupled to the outer edge portion of the disc and a second end coupled to the front wall portion of the bladder, a center longitudinal through the link arm from the first end to the second end extending in a plane disposed radially relative to a central axis through the piston.

11. A valve element as claimed in claim 10 wherein the center longitudinal through the link arm from the first end to the second end extends radially inwardly.

12. A valve element as claimed in claim 10 wherein the center longitudinal through the link arm from the first end to the second end extends radially inwardly and axially away from the disc.

13. A valve element as claimed in claim 9 wherein the back wall portion of the side wall formed in part integrally with the stem.

14. A valve element as claimed in claim 1 in combination with a chamber forming member defining a chamber therein having an inner end, an outer end and a chamber side wall, the valve element coaxially received in the chamber with the outer edge portion of the disc engaging the chamber side wall to restrict the fluid flow through the chamber past the disc having regard to the pressure differential across the disc, in moving from the uncollapsed condition to the collapsed condition the bladder moving a segment of the resilient outer edge portion radially inwardly and changing the extent to which the outer edge portion restricts fluid flow in the chamber past the disc.

15. A valve element as claimed in claim 14 wherein the inner end of the chamber is in communication with a fluid reservoir.

16. A valve element as claimed in claim 15 wherein the valve element is coaxially reciprocally slidable inwardly and outwardly relative the chamber, the valve element forming with the chamber forming member a piston pump such that reciprocal coaxial sliding of the valve element in the chamber draws the fluid through the inner end of the chamber and discharges it out an outlet.

17. A valve element as claimed in claim 16 wherein the disc forms with the chamber side wall a one-way valve resisting fluid flow inwardly therepast from the fluid reservoir into the chamber.

18. A valve element as claimed in claim 17 wherein the stem has an outer end and an inner end;

the disc on the stem spaced inwardly from the outer end towards the inner end;

an annular sealing member on the stem spaced outwardly from the disc, the sealing member extending radially outwardly from the stem to an outer edge portion which engages the chamber wall to prevent the fluid flow in the chamber outwardly therepast;

the stem having a central passageway therethrough open at the outer end as a discharge opening and extending coaxially within the stem to an inlet open radially through the stem into the chamber intermediate the disc and the sealing member, the bladder disposed radially outwardly of the passageway and extending axially through the sealing member in sealed engagement therewith for coupling with the disc inwardly of the sealing member, the bladder presenting its access port directed axially outwardly outward of the sealing member.

19. A method of use of a valve element as claimed in claim 15 for evacuating gas from the fluid reservoir when substantially filled with liquid;

wherein the fluid reservoir is collapsible, the method comprising causing the bladder to assume the collapsed condition while applying a vacuum to draw gas in the reservoir outwardly therefrom past the disc.

20. A method of preparing a replaceable fluid reservoir for insertion into a dispenser housing, wherein said reservoir has coupled thereto a pump assembly which when activated dispenses fluid from said reservoir, said pump assembly including, a chamber-forming element having a chamber, said chamber having chamber wall, an outer open end and an inner end in fluid communication with said reservoir, and one-way valve means disposed across said chamber permitting fluid flow therepast through the chamber only from the reservoir outwardly towards the outer open end, said one-way valve means permitting air to be drawn therepast towards the outer open end under a first negative pressure while permitting fluid to be drawn therepast under a second negative pressure which is further below atmospheric pressure than said first negative pressure, said method comprising the steps of:

substantially filling said reservoir with fluid, and evacuating air from said reservoir by applying a vacuum to a portion of said chamber which is spaced outwardly from said one-way valve means, said vacuum providing vacuum pressure at least as far below atmospheric pressure as said first negative pressure to draw out air from said chamber and said reservoir.

wherein said pump assembly includes a piston forming element configured to be slidably received in the chamber, and wherein axially inward and outward sliding of said piston forming element in said chamber dispenses said fluid, said piston element comprising:

an axially extending stem, a disc extending radially outwardly therefrom to a resilient outer edge portion, a flexible bladder carried on the stern having an interior cavity enclosed but for being open to an access port, the bladder coupled to the outer edge portion of the disc;

the bladder having an inherent resiliency biasing the bladder to assume a first shape, the resiliency of the bladder permitting the bladder be deformed to assume a second shape different than the first shape and with the inherent bias urging the bladder to reassume the first shape, in moving from the first shape to second shape the bladder moving a segment of the resilient outer edge portion, the piston element coaxially slidably received in the chamber with the outer edge portion of the disc engaging the chamber side wall to restrict said fluid flow through the chamber past the disc having regard to a pressure differential across the disc, the method further including during the step of evacuating said air, deforming the bladder to the second shape.

* * * * *